United States Patent [19]
Poggio et al.

[11] Patent Number: 5,659,692
[45] Date of Patent: Aug. 19, 1997

[54] COMPUTER METHOD AND APPARATUS FOR VIDEO CONFERENCING

[75] Inventors: Tomaso A. Poggio, Wellesley, Mass.; Bin Zhang, Milpitas; Chiejin Cheng, Cupertino, both of Calif.

[73] Assignee: Massachusetts Institute of Technology, Cambridge, Mass.

[21] Appl. No.: 436,518

[22] Filed: May 8, 1995

Related U.S. Application Data

[63] Continuation-in-part of Ser. No. 819,767, Jan. 13, 1992, Pat. No. 5,416,899.

[51] Int. Cl.$^6$ ............................................. G06T 5/50
[52] U.S. Cl. ............................. 395/330; 395/175
[58] Field of Search .............................. 395/153, 152, 395/154, 138; 348/12, 15

[56] References Cited

U.S. PATENT DOCUMENTS

| | | | |
|---|---|---|---|
| 3,510,210 | 5/1970 | Haney | 395/152 |
| 4,414,621 | 11/1983 | Bown et al. | 364/200 |
| 4,600,919 | 7/1986 | Stern | 340/725 |
| 4,797,836 | 1/1989 | Witek et al. | 364/518 |
| 5,029,997 | 7/1991 | Faroudja | 352/54 |
| 5,245,553 | 9/1993 | Tanenbaum | 364/514 |
| 5,261,041 | 11/1993 | Susman | 395/152 |
| 5,416,899 | 5/1995 | Poggio et al. | 395/152 |

FOREIGN PATENT DOCUMENTS

WO89/09458   10/1989   WIPO.

OTHER PUBLICATIONS

Wilhelms, "Toward Automatic Motion Control" *IEEE Computer Graphics and Applications*, 7(4):11–22 (1987).

Steketee et al., "Parametric KeyFrame Interpolation Incorporating Kinetic Adjustment and Phrasing Control", *Computer Graphics*, 19(3):255–262 (1985).

Sturman, "Interactive KeyFrame Animation of 3-D Articulated Models", *Proceedings of Graphics Interface '84*, pp. 35–40 (1984).

Burtnyk et al., "Computer Assisted Film Animation," *Bulletin of the Radio and Electrical Engineering Division, National Research Council of Canada*, 20(3):8–12 (Sep. 1970).

Wein et al., "Computer Graphics and Film Animation," *Bulletin of the Radio and Electrical Engineering Division, National Research Council of Canada*, 19(2):39–42 (Apr. 1969).

Burtnyk et al., "Computer–Generated Key–Frame Animation," *Journal of the Society of Motion Picture and Television Engineers*, 80(3):149–153, (Mar. 1971).

Wein et al., "A Computer Facility for Film Animation and Music," *Canadian Computer Conference Session*, pp. 2122–2125 (Jun. 1971).

Burtnyk et al., "Towards a Computer Animating Production Tool," *Eur Comput Congr Proc.*, pp. 171–185 (May 13–17, 1974).

(List continued on next page.)

*Primary Examiner*—Heather R. Herndon
*Assistant Examiner*—Sabrina Dickens
*Attorney, Agent, or Firm*—Hamilton, Brook, Smith & Reynolds, P.C.

[57] ABSTRACT

Computer method and apparatus provides remote communication of images with low communication bandwidth requirements. Workstations are remotely coupled to each other across a communication channel (e.g., telephone line or Internet line) and employ the invention method and apparatus. Parameter values of desired images are input at one workstation and transmitted across the communication channel to a remote workstation. In response to the input parameter values, the remote workstation generates and displays the desired images. Video e-mail messages is one application of such remote generation of desired images. Further parameter values may be input at the remote workstation for generation and display of corresponding further images at the initial workstation. Interactive video conferencing results as the workstations remotely communicate images in real-time to each other.

31 Claims, 6 Drawing Sheets

OTHER PUBLICATIONS

Burtnyk et al., "Interactive Skeleton Techniques for Enhancing Motion Dynamics in Key Frame Animation," *Communications of the ACM*, 19(10):564–569 (Oct. 1976).

Takeshi et al., "Three Dimensional Computer Animation by Trigonometric Approximation to Aperiodic Motion," *Systems and Computers in Japan*, 19(5):82–88 (May 1988).

Yang et al., "Automatic Curve Fitting with Quadratic B–Spline Functions and Its Applications to Computer–Assisted Animation," *Computer Vision, Graphics, and Image Processing*, 33(3):346–363 (Mar. 1986).

Bortman, Henry, "The Future of Type?" *MacUser*, pp. 187–195 (Jul. 1991).

Litwinowicz, Peter, "Inkwell: A 2 1/2–D Animation System," *Computer Graphics*, 25(4):113–121 (Jul. 1991).

Poggio et al., "A Theory of Networks for Approximation and Learning," AI Memo No. 1140, pp. 1–84, Arificial Intelligence Laboratory, MIT, Jul. 1989.

Poggio et al., "Regularization Algorithms for Learning that are Equivalent to Multilayer Networks," *Science*, 247:978–982 (Feb. 23, 1990).

Poggio et al., "Networks for Approximation and Learning," *Proceedings of the IEEE*, 78(9):1481–1497 (Sep. 1990).

Poggio et al., "A Network that Learns to Recognize Three Dimensional Objects," *Nature*, 343(6255):263–266 (1990).

Kimoto et al., "A Method for Frame Representation of Moving Objects for Knowledge–Based Coding," *Systems & Computers in Japan*, 21(7):63–74 (1990).

COMPUTER METHOD AND APPARATUS FOR VIDEO CONFERENCING

RELATED APPLICATIONS

The following is a continuation-in-part of U.S. patent application Ser. No. 07/819,767, filed Jan. 13, 1992, U.S. Pat. No. 5,416,899, issued May 16, 1995 entitled "Memory Based Method and Apparatus for Computer Graphics" by inventors Tomaso A. Poggio and Roberto Brunelli. The disclosure of that application is herein incorporated by reference. For convenience and clarity in understanding the present invention, pertinent portions of the related application are repeated or summarized below.

BACKGROUND OF THE INVENTION

There are many traditional and newly emerging communications technologies that are addressing the connectivity and communications requirements for person-to-person and machine-person interaction. The physical communications technologies include:

Low bandwidth telephone systems—the regular home and office telephone service; simple data can be sent over these lines with the use of modem technology (currently at 14.4 kbps). Within the traditional telephone network, several high bandwidth means of communications are used to digitally transmit bundles of voice lines. These include: microwave, fiber optic, and satellite communications.

ISDN Services—phone companies are trying to introduce higher bandwidth digital services that can also carry regular voice, but with the extra bandwidth (64 kbytes and higher) can also support digital data communications and potentially low-end video conferencing.

Fiber Optic—cable companies and phone companies want to bring this high bandwidth (mbytes) service to the individual home. This will eventually replace the coaxial cables currently used to deliver cable television services.

Satellite Services—these provide a high bandwidth alternate to fiber optic communications.

Computer networks such as the Internet, LANs, and WANs.

These technologies are all meant to deliver data, analog and digital (but increasingly digital), from point A to point B. If the data can be presented in a real-time fashion then two-way interactive communications can be established. This happens already with voice, which is a low bandwidth signal (under 3 khz). However, with graphics, moving pictures, and video images, the bandwidth requirements are several orders of magnitude higher. Many of the above physical communications technologies are meant to provide sufficient bandwidth not only for voice, but also for video in a real-time fashion (e.g., movies, teleconferencing, video conferencing).

The basic problem with any real-time graphics or video images, is that moderate to high bandwidth continuously connected services are required. This means coaxial cables, fiber optics, and in some limited cases (degraded video images) ISDN services are required. The continuous connection requirement means that real-time graphics or video interaction (video conferencing) cannot be accomplished over the Internet and LANs that are packet switched (bursty, message oriented so there is no guarantee of continuous service).

SUMMARY OF THE INVENTION

The present invention overcomes the foregoing problems of prior art. In particular, the present invention provides a method and apparatus for transmitting graphics and video data with minimal communications bandwidth requirement. As such, the present invention enables and provides graphics or video interactive communications, in real-time (e.g., video conferencing) or non-real-time (e.g., video e-mail).

In a preferred embodiment, a multiplicity of workstations are coupled to a low bandwidth communication channel across a distance. At least a first workstation is coupled to one end of the channel and a second workstation is coupled to the opposite end of the channel. Each workstation includes I/O devices such as a display monitor and/or input means. The second workstation includes a computer graphics and animation assembly having (i) a preprocessor for determining control points and corresponding plane coordinate values of a subject along working axes in a sample view, the sample view having parameter values of each working axis indicative of the position of the subject in that sample view, and (ii) an image processor coupled to the preprocessor and responsive to the associations between the coordinate values of the control points and the parameter values of a sample view. The image processor maps the coordinate values of control points for sample positions of the subject in plural sample views to control point coordinate values for desired intermediate positions of the subject along each working axis to form intermediate (desired) views of the subject. In response to user input, at the first workstation end of the communication channel, of parameter values of desired views, the second workstation receives the input parameter values across the communication channel. Using the computer graphics and animation assembly, the second workstation then forms the desired views and displays said views on the display monitor of the second workstation. As such the views are displayed remotely from the first workstation.

Alternatively, other (or each) workstations coupled to the communication channel include a computer graphics and animation assembly for forming views of a subject by interpolating parameter values of the views with respect to predefined sample views (like the computer graphics and animation assembly of the second workstation). Preferably, the computer graphics and animation assemblies employ a Hyper Basics Function Network (including radial basis function interpolation, regularization or multivariable spline operations). In turn, the first workstation locally displays the desired views and thus monitors the views displayed remotely on the second workstation monitor. The first workstation is also able to receive parameter values initiated at the second workstation end of the communication channel, and in turn generate and display images remotely from the second workstation.

Further, using pairs of such workstations spaced across the communication channel (e.g., the first and a third workstation coupled to one end of the channel and the second and a fourth workstation coupled to the opposite end), video conferencing is achieved. In further response to the views displayed on the display monitor of the second workstation, a user at the fourth workstation inputs other parameter values of response views he desires. These other parameter values are transmitted from the fourth workstation across the communication channel to the third workstation. The third workstation in response to the other parameter values, uses its computer graphics and animation assembly and forms and displays the response views. Moreover, said views are displayed on the display monitor of the third workstation remotely from the fourth workstation, in a manner such that the user at the first workstation and the user at the fourth workstation are responding in real-time to each others remotely displayed views and thus video conferencing.

In some cases (as desired), the other parameter values input at the fourth workstation (or the second workstation) update the parameter values input at the first workstation end of the communication channel such that the third (or first) workstation displays views that are variations of the views displayed at the second workstation.

In accordance with one aspect of the present invention, the parameter values of desired images are automatically generated through appropriate I/O means. For example, a first image recognition system is coupled to the first workstation end of the communication channel. A second image recognition system is coupled to the fourth workstation end of the communication channel. A first camera is coupled to the first image recognition system; and a second camera is coupled to the second image recognition system. The first image recognition system and first camera provide a video image of a user at the first workstation end of the communication channel. That video image is then automatically input as parameter values at the first workstation end of the communication channel. Those parameter values are transmitted across the communication channel to the second workstation, such that an image of the first workstation user is displayed on the display monitor of the second workstation in combination with the desired views. Likewise, the second image recognition system and second camera provide video images of a user at the fourth workstation. The video images form parameter values at the fourth workstation end of the communication channel which are automatically input and transmitted across the communication channel to the third workstation. In turn, (after HBF interpolation by the third workstation) an image of a user at the fourth workstation is displayed on the display monitor of the third workstation in combination with the response views displayed on the display monitor of the third workstation.

In another example, the parameter values are input by a user through a keyboard, joystick, mouse or the like. In turn, a desired icon is generated from the input parameter values. The user is able to continue to control icon movement and remote display thereof through the present invention.

In accordance with another aspect of the present invention, the communication channel is a telephone line or Internet line, for example. Generally, the channel has a bandwidth of about 14k bauds or less (in the example telephone lines), and more particularly, handles about 1,500 bits per second through about 3,000 bits per second for teleconferencing.

BRIEF DESCRIPTION OF THE DRAWING

The foregoing and other objects, features and advantages of the invention will be apparent from the following more particular description of preferred embodiments and from the drawings in which like reference characters refer to the same parts throughout the different views. The drawings are not necessarily to scale, emphasis instead being placed upon illustrating the principles of the invention.

FIG. 4b is a flow diagram of image preprocessing and processing subsystems of the apparatus of FIG. 4a.

DETAILED DESCRIPTION OF THE PREFERRED EMBODIMENTS

Figure 1A:
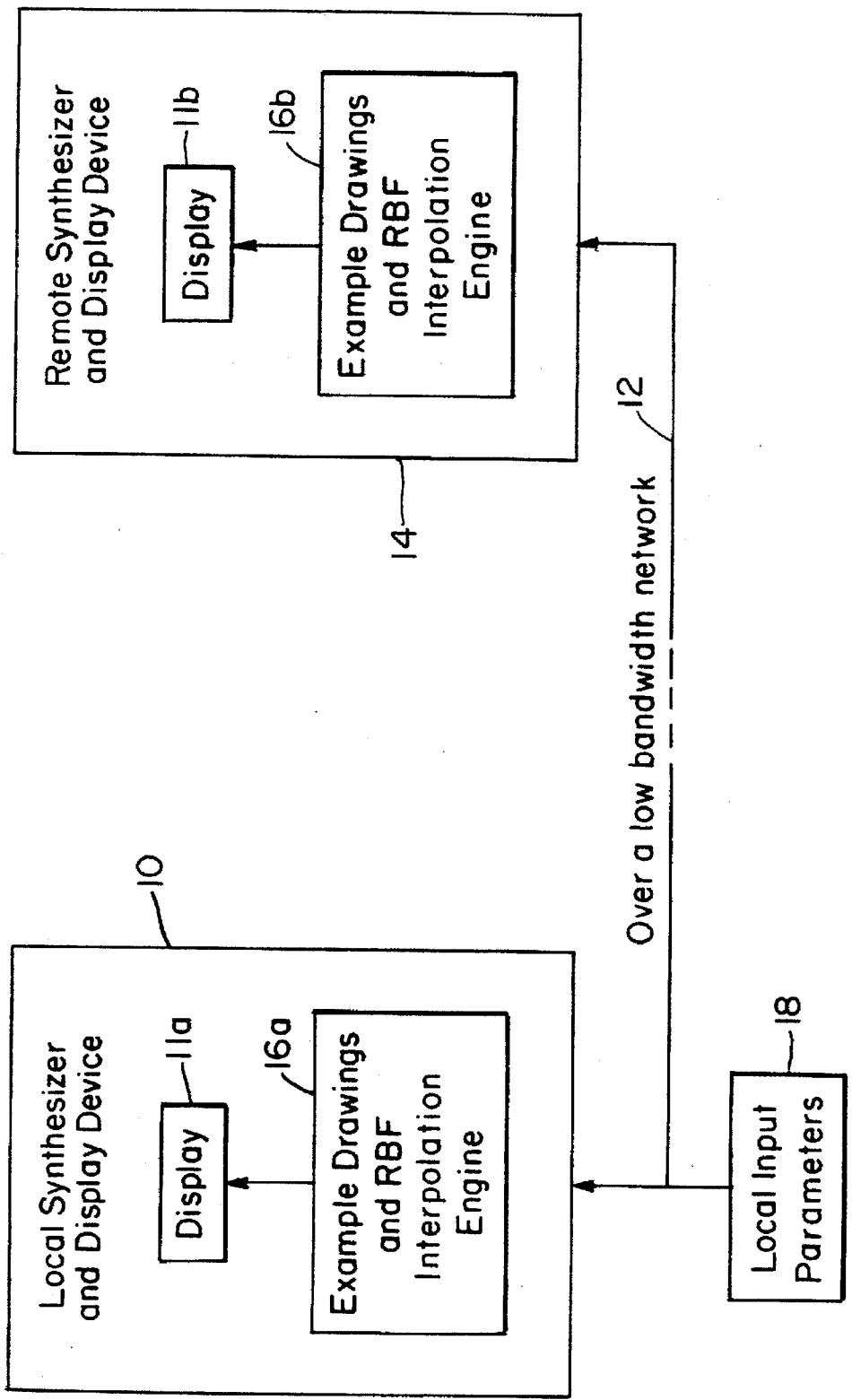
FIGS. 1a–1b are block diagrams of a remote display system embodying the present invention.

The present invention and that of the related application provides such an enormous degree of motion graphics (especially, vector based graphics for the present invention) compression, that real-time graphics interaction can be accomplished with very little bandwidth. Thus, real-time visual interaction can be accomplished over a regular telephone line, the Internet, and the like as herein before unachieved by prior art.

In the related application, the disclosed computer method and apparatus generate 3D graphics and animation based on two dimensional views and novel approximation techniques instead of 3D physical based modelling as in prior art. In general, that invention method uses a few views of a subject, such as a person, a face or a head, to generate intermediate views of the same, under the control of a set of parameters. Each sample view illustrates the subject of interest in a different pose or facial expression defined along a grid of working axes, or at a different time t along a single time axis. The corresponding points along the working axes (or the corresponding value of t) in turn forms the set of parameter values. That is, the parameters are points along the working axes and the views correspond to different intersections of sets of the points along the working axes.

The working axes may be any geometrical or graphical aspect for describing a subject, such as a longitudinal axes, horizontal axes, or axes indicating expression of the eyes, mouth and so forth. To that end, the parameters define, for example, angle of rotation about a longitudinal working axis, angle of tilt about an orthogonal working axis, 3D position (or orientation) of the subject, or degree of happiness/sadness of the mouth and/or degree of openness of the eyes (i.e., the expressions of a face from happy to sad, asleep or surprised, etc.), and the like.

In addition, for each of the sample views of the subject, a set of two dimensional control points in the plane of the view, such as characteristic features, body junctions, etc. is identified and defined. This includes establishing local values for each control point in each of the sample views. For each sample view, a parameter value (or set of parameter values) represents the point (points) along the working axis (axes) from which the sample view is defined.

In turn, an input-output mapping between parameter values of the given sample views of the subject and the location values (for the control points) is established. From this mapping the parent invention is able to generate desired intermediate views between two of the initial sample views and subsequentially between newly generated intermediate views and/or initial sample views. That is, the parent invention is able to generate location values of the control points for desired parameter values of intermediate positions of the subject along the working axes to form intermediate views. Such generation of intermediate views or "in betweening" is accomplished by interpolation of values of the control points from control point values associated with the parameter values initially defined for the sample views to control point values for desired parameter values of intermediate views.

To give relative depth of the different control points, z buffering techniques, line filling or texture mapping are employed. In particular, the control points in their determined (calculated) locations/location values define polygons which correspond from view to view and are able to be line filled or grey scale filled by common methods. As a result, a series of views (or images) of an object and (with proper rendering or display) animation thereof is obtained without an explicit 3-D physical based model of the object.

Figure 5:
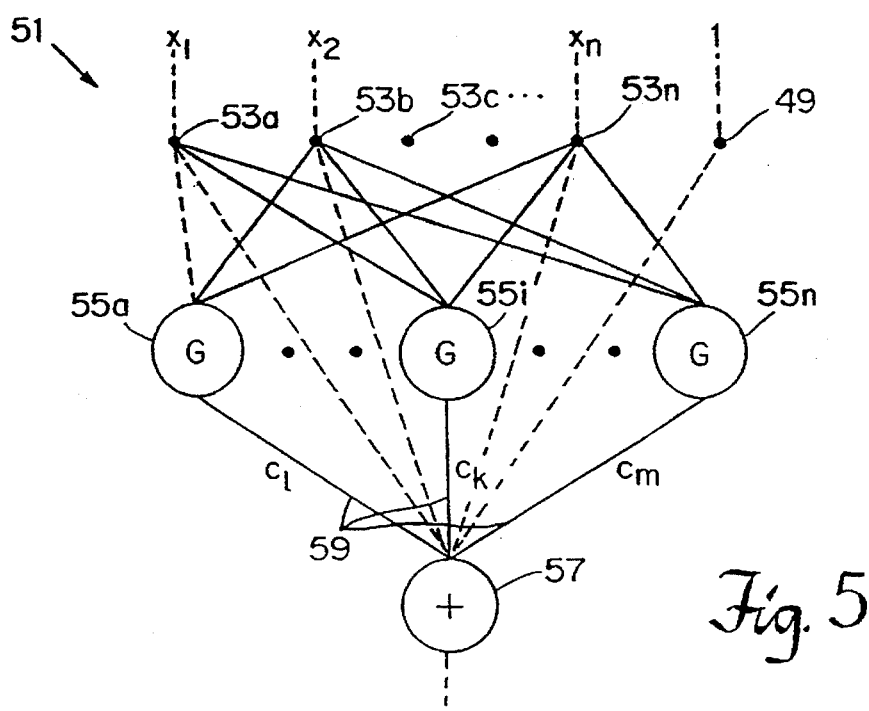
FIG. 5 is a schematic illustration of a neural network employed by the computer graphics apparatus in FIGS. 4a and b.

In a preferred embodiment, the step of assigning control point values to the set of parameters involves a neural network learning from examples in which each of the given views serves as a training set and is associated with respective parameter values, i.e., points along the working axes, (such as the pose and expression of the person). The learning technique employed is that of the so called Hyper Basis Functions (HBF). A special case of the HBFs are the so called Radial Basis Functions in which an unknown multi-variable function is approximated by the superposition of a given number of radial functions whose centers are located on the points of the training set (i.e., control points). Other regularization networks including multivariable splines are suitable instead of a Radial Basis Function Network. See parent application and references incorporated therein. FIG. 5 is illustrative of such a neural network.

Neural network or more specifically the Hyper Basis Function Network 51 is formed of a layer of input nodes 53, coupled to a layer of working nodes 55 which send activation signals to a summing output node 57. The input nodes 53 transmit signals indicative of an input pattern. These signals are based on the control points $C_i$, corresponding parameter values defining the view of the subject in the input pattern and desired movement $\alpha$. That is, for each given sample/input view, location of subject parts, for example forearm, thigh, shin and foot is determined according to a coordinate system in the plane of the view. The coordinates for each subject part (forearm, thigh, shin, foot) form a set of control point values denoted $\{C_i\}$. For each different movement $\alpha$ (e.g., jumping, walking, running, etc.), a first map $M_\alpha$ (discuss below) associates control point values $C_i$ with specific respective parameter values (i.e., points along the working axes).

From each set $\{C_i\}$ of control point values the absolute coordinates of the control points is transformed to Barycentric coordinates by common methods and means. The resulting control points in barycentric coordinates forms a new set $\{C_i^B\}$ of control point values. It is this new set of control point values which is used in the first mapping from sample views to desired intermediate views. Barycentric coordinates are used because this mapping is intrinsic to the subject, while movement to the subject is relative to the environment.

Each input node 53 (FIG. 5) is coupled to each working node 55, that is, the layer of input nodes 53 is said to be fully connected to working nodes 55 to distribute the input pattern amongst the working node layer.

By way of background, the subject S of the input patterns is composed of a given number of polygonal elements $U_i$, each element $U_i$ being defined by a subset of the set of control points $\{C_i^B\}$. For example a triangle element $U_i$ is formed by three control points in the subject, and other elements $U_i$ are rectangles, ellipses and the like in the subject S. Subject S is then mathematically denoted $$S=\{U_i\}.$$

Animation of the subject S, using a particular movement map $M_\alpha$ along a working axis of time, for example, amounts to introducing a temporal dependence denoted $$S(t)=\{U_i(t)\}.$$

Each element $U_i(t)$ is computed using the map $M_\alpha$ for the given movement. That is, each single control point value $C_i$ of element $U_i$ is mapped by the function $M_\alpha$ resulting in the transformed $U_i$, and the same is done for each $U_i$ (and its control point values $C_i$) of subject S. An intermediate view results. Further intermediate views are similarly generated using the foregoing transformation of each element $U_i$ of subject S according to the function of the desired map $M_\alpha$. It is from these intermediate views that an image sequence for a graphic animation of the subject is generated from sample views.

Having generated intermediate views from sample views, a texture mapping is next employed to create images from the intermediate views, and in particular an image sequence for the graphic animation of the subject. Texture mapping is accomplished by standard techniques known in the art. In particular, texture mapping maps grey values for each of the polygons defined between control points of a sample view to the corresponding polygons in the generated intermediate views.

In a preferred embodiment, neural network 51 implements the function:

$$f^*(x) = \sum_{\alpha=1}^{n} c_\alpha G(\|x-t_\alpha\|_w^2) + p(x) \qquad \text{Equation 1}$$

where

G(x) is a radial Gaussian function (such as the radial Green's function defined in "Networks for Approximation and Learning" by T. Poggio and F. Girosi, IEEE Proceedings, Vol. 78, No. 9 September 1990), thus, G(x) is a Gaussian distribution of the square of the distance between desired x and predetermined $t_\alpha$.

x is the position or points along working axes (parameter values) for which control point location values are desired;

$c_\alpha$ are coefficients (weights) that are "learned" from the known/given control point values of sample views 21. There are in general much fewer of these coefficients than the number N of sample views ($n \leq N$).

$t_\alpha$ is a so called "center" of the Gaussian distribution and is on a distinct set of control points with known parameter values from given sample views 21; and p(x) is a polynomial that depends on chosen smoothness assumptions. In many cases it is convenient to include up to the constant and linear terms.

Further function G may be the multiquadric $G(r)=\sqrt{c+r^2}$ or the "thin plate spline" $G(r)=r^2 \ln r$, or other specific functions, radial or not. The norm is a weighted norm $$\|x-t_\alpha\|_w^2 = (x-t_\alpha)^T W^T W (x-t_\alpha) \qquad \text{Equation 2}$$

where W is an unknown square matrix and the superscript T indicates the transpose. In the simple case of diagonal W the diagonal elements $w_i$ assign a specific weight to each input coordinate, determining in fact the units of measure and the importance of each feature (the matrix W is especially important in cases in which the input features are of a different type and their relative importance is unknown).

From the foregoing Equations, location values for control points in intermediate views at times t in the foregoing example (or more generally at desired points/parameter values along working axes) are approximated (interpolated), and in turn sample view elements $U_i$ are mapped to the transformed instance $U_i(t)$ of that element. As a result, intermediate views for a first image sequence part between sample views are generated for a first range of t. Intermediate views for a second image sequence part between succeeding sample views are generated for an immediately succeeding range of t. Intermediate views for a third image sequence part between further succeeding sample views are generated for a further succeeding range of t. And so forth through intermediate views for a last image sequence part between the last two sample views which are generated for an ending range of t.

Effectively a smooth image sequence of the subject moving (for example, walking, running, jumping) is generated. Smooth image sequences for other movements of the subject are understood to be similarly generated from the foregoing discussion. In a like manner, smooth image sequences for different poses (defined by rotation about a longitudinal axis and/or tilt about an orthogonal axis, and the like) and/or different facial expressions are understood to be similarly generated.

Referring back to FIG. 5, working nodes 55 are activated according to Equation 1 (discussed above) in two different modes, initially in a learning mode and thereafter in operation mode for mapping desired patterns. During learning mode, the sample views of a subject of interest serves as a training set of input patterns. More accurately, the control points of the sample views and their corresponding parameter values along a working axis (or axes) for the given movement $\alpha$ provides an input-output mapping $M_\alpha$ to working nodes 55. Internal weights and network coefficients ($c_\alpha$, $w_i$ or W, $t_\alpha$) are adjusted for each input-output mapping of the sample views and consequently are made to converge at respective values.

In the preferred embodiment this includes finding the optimal values of the various sets of coefficients/weights $c_\alpha$, $w_i$ and $t_\alpha$, that minimize an error functional on the sample views. The error functional is defined $$H[f^*] = H_{c,t,W} = \sum_{i=1}^{N} (\Delta_i)^2, \quad \text{Equation 3}$$

with $$\Delta_i \equiv y_i - f^*(x) = y_i - \sum_{\alpha=1}^{n} c_\alpha G(\|x_i - t_\alpha\|_W^2).$$

A common/standard method for minimizing the error function is the steepest descent approach which requires calculations of derivatives. In this method the values of $c_\alpha$, $t_\alpha$ and W that minimize $H[f^*]$ are regarded as the coordinates of the stable fixed point of the following dynamical system:

$$\dot{c}_\alpha = -\omega \frac{\partial H[f^*]}{\partial c_\alpha} \quad \alpha = 1, \ldots, n \quad \text{Equation 4}$$

$$\dot{t} = -\omega \frac{\partial H[f^*]}{\partial t_\alpha} \quad \alpha = 1, \ldots, n \quad \text{Equation 5}$$

$$\dot{W} = -\omega \frac{\partial H[f^*]}{\partial W} \quad \text{Equation 6}$$

where $\omega$ is a system parameter.

A simpler method that does not require calculation of derivatives is to look for random changes in the coefficient values that reduce the error. Restated, random changes in the coefficients/weight $c_\alpha$, $t_\alpha$, and W are made and accepted if $H[f^*]$ decreases. Occasionally changes that increase $H[f^*]$ may also be accepted.

Upon the internal weights and network coefficients taking on (i.e., being assigned) these values, the neural network 51 is said to have learned the mapping for movement $\alpha$ (denoted $M_\alpha$ above). Movement $\alpha$ may be an element of the set consisting of walking, running, jumping etc., with parameter values along a single working axis of time. Movement $\alpha$ may be an element in a set of poses (orientation by angles of rotation and tilt) with parameter value pairs along two working axes. Movement $\alpha$ may be an element in a set of poses and expressions with parameter values in triplets along three working axes (a longitudinal, horizontal and expression axes). And so on, commensurate with the previous discussion of working axes. The same learning procedure is employed for each given movement $\alpha$ with sample views for the same. Thus, at the end of learning mode, the neural network 51 is trained to map a set of parameter values along pertinent working axes into 2-dimensional views of the subject of interest.

After completion of the learning mode, and hence establishment of internal weights and network coefficients W, $c_\alpha$, $t_\alpha$, the working nodes 55 are activated in operation mode. Specifically, after learning, the centers $t_\alpha$ of the basis functions of Equation 1 above are similar to prototypes, since they are points in the multidimensional input space. In response to the input signals (parameter values/coordinates of desired position or view of a subject along working axes) from input nodes 53, each working node 55 computes a weighted distance of the inputs from its center $t_\alpha$, that is a measure of their similarity, and applies to it the radial function G (Equation 1). In the case of the Gaussian G, a working node has maximum activation when the input exactly matches its center $t_\alpha$. Thus, the working nodes 55 become activated according to the learned mappings $M_\alpha$.

Working nodes 55 transmit generated activation signals G along lines 59 to summing output node 57. Each transmission line 59 multiplies the respective carried activation signal by a weight value $c_\alpha$ determined during the learning mode of the network. Thus output node 57 receives signals cG from each working node 55 which represents the linear superposition of the activations of all the basis functions in the network 51. Output node 57 adds to the CG signals direct, weighted connections from the inputs (the linear terms of p(x) of Equation 1 shown by dotted lines in FIG. 5) and from a constant input node 49 (a constant term). The total provides an output in accordance with Equation 1.

This output is interpreted as the corresponding map for the given input (desired) parameter values. That is, the output defines the coordinates (location values) of the control points for intermediate views, and ultimately defines the image sequence for the initial sample views.

It is noted that in the limit case of the basis functions approximating delta functions, the system 51 of FIG. 5 becomes equivalent to a look-up table. During learning, the weights c are found by minimizing a measure of the error between the network's prediction and each of the sample views. At the same time the centers $t_\alpha$ of the radial functions and the weights in the norm are also updated during learning. Moving the centers $t_\alpha$ is equivalent to modifying the corresponding prototypes and corresponds to task dependent clustering. Finding the optimal weights W for the norm is equivalent to transforming appropriately, for instance scaling, the input coordinates correspond to task-dependent dimensionality reduction.

Software/Hardware Support

Figure 4A:
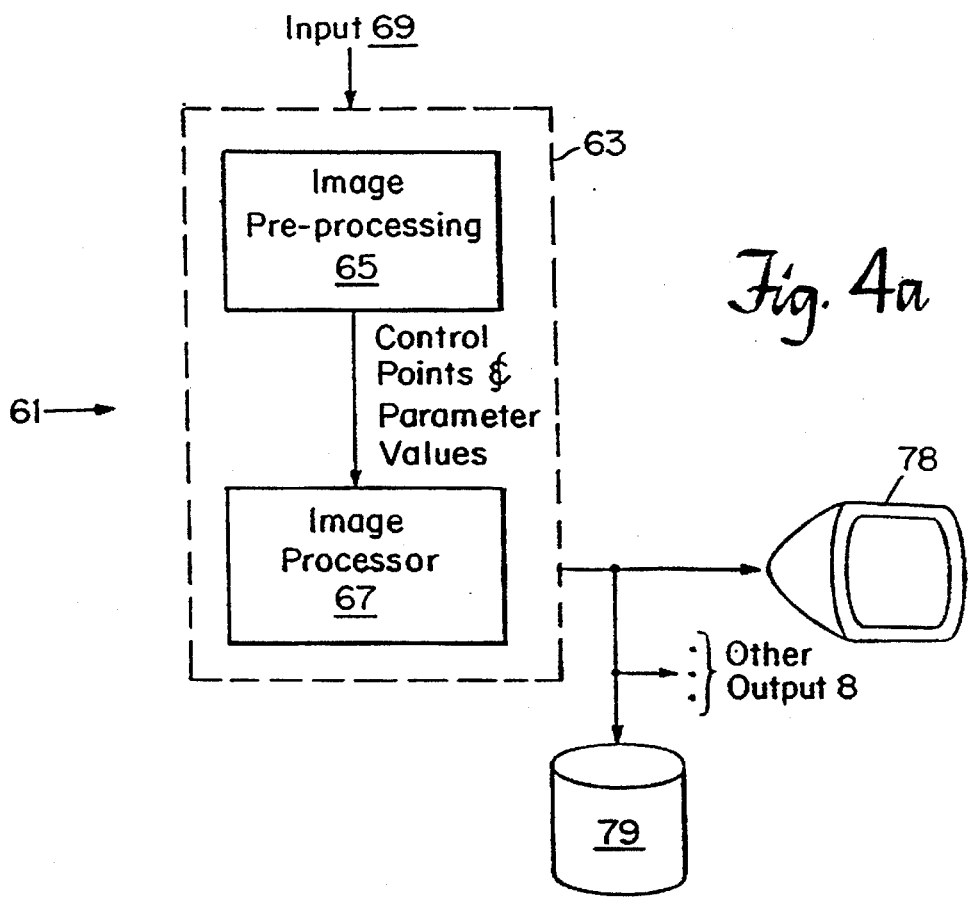
FIG. 4a is a block diagram of computer graphics apparatus employed by the present invention.
Figure 4B:
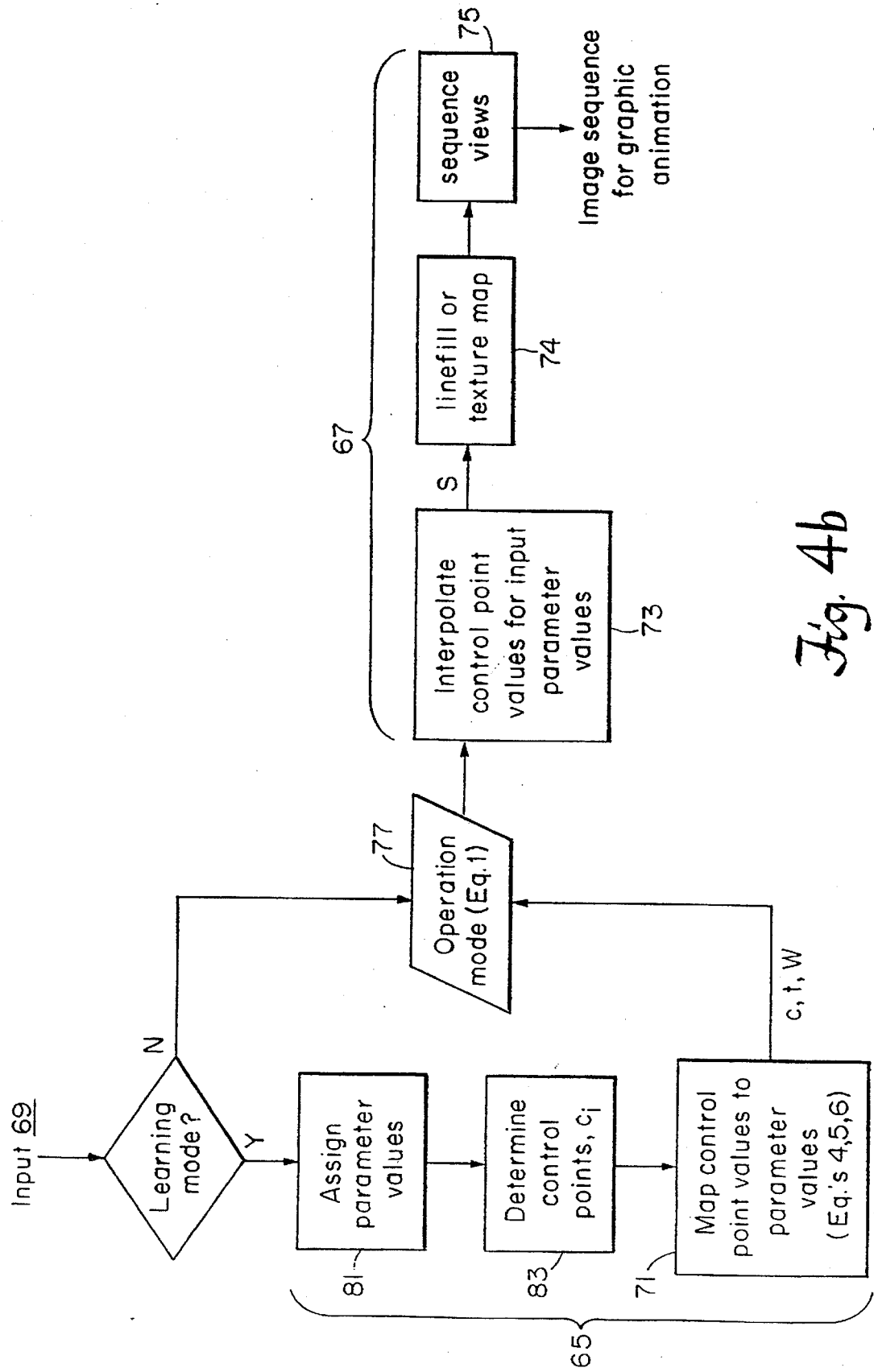

The pattern mapping system 51 of FIG. 5 is generally embodied in a computer system 61 illustrated in FIGS. 4a and 4b. Referring to FIG. 4a, a digital processor 63 of the computer system 61 receives input 69 from internal memory, I/O devices (e.g., a keyboard, mouse and the like) and/or memory storage devices (e.g., importable memory files, disk storage, and the like). In the case where the input is sample views or input patterns the digital processor 63 employs an image preprocessing member 65 for determining a set of control points $C_i$ and corresponding values for each control point throughout the different input patterns 69. The preprocessing member 65 also determines for each input pattern, the corresponding parameter values for a desired movement α of a subject in the input pattern 69. The image preprocessing member 65 is implemented in hardware, software or a combination thereof as made clear later. One implementation is neural network 51 in its learning mode as illustrated in FIG. 5. A more general software implementation is outlined in the flow diagram of FIG. 4b.

Referring to the left side portion of FIG. 4b, when input 69 is sample views or input patterns 69, image preprocessor 65 implements a learning mode. Given (from the user or other sources) at the start of the learning mode is a definition of the working axes. At 81, in FIG. 4b, image preprocessor 65 establishes parameter values (points) along the working axes and assigns a different parameter value (single, pair or triplet, etc.) to each input pattern (sample view) 69. Next at 83, image preprocessor 65 extracts a set of control points $C_i$ for application to each input pattern 69, and for each input pattern determines control point values.

At 71, image preprocessor 65 establishes an association or mapping $M_\alpha$ between values of the control points and parameter values of the working axes. In effect, this is accomplished by image preprocessor 65 calculating Equations 4, 5 and 6 (discussed above) to determine the coefficients for Equation 1 (the supporting equation of network 51 in FIG. 5). From 71, coefficients $c_\alpha$, $t_\alpha$ and W result, and in turn defines the Hyper Basis function network 51 operation mode, which implements Equation 1 as discussed in FIG. 5. Another implementation of the function (Equation 1) supporting operation mode is image processor 67 outlined in flow diagram fashion in the right side portion of FIG. 4b and discussed next. It is understood that other implementations are suitable.

When input 69 is an indication of user desired views at input parameter values along the working axes, the input 69 is transferred to operation mode module 77. Under operation mode module 77, for each desired position (input parameter values) of the subject in the desired movement α (along the working axes), image processor 67 (i) applies mapping $M_\alpha$ to the input parameter values and (ii) determines the corresponding control point values. This is accomplished by interpolation (using Equation 1) as indicated at 73 in FIG. 4b. Image processor 67 uses the resulting values of control points $C_i$ to define polygonal elements $U_i$, and in turn forms subject S in the desired position along working axes. At 74 image processor 67 applies line filling or texture mapping to form an intermediate view of the resulting subject S. Image processor 67 next places in the formed view in sequence 75 with other views (i.e., desired positions of the subject) generated for the desired movement α of the subject S.

Referring back to FIG. 4a, digital processor 63 displays the formed image sequence through a display unit 78 to provide graphical animation of the subject S. Alternatively, digital processor 63 stores the image sequence in a memory storage device/area 79 for later display. Other I/O devices to which the image sequence is output includes, without limitation, printers, facsimile machines, communication lines to remote computer workstations, and the like, illustrated at 8 in FIG. 4a.

The computer system 61 of FIGS. 4a and 4b can also generate isolated views, if so desired, corresponding to input parameter values (position of the subject along working axes) that do not correspond to any of the example views used in training. The computer system 61 can also generate views of another subject in the same class of the subject for which a sequence of views has been generated for a desired movement.

The foregoing Hyper Basis Function (HBF) interpolation technology (neural network 51 and computer system 61) of the related application (and especially the radial basis function version) has applications in interactive visual communications as now disclosed by the present invention. In many situations, cartoon images (vector based images) can actually be better than real (bit-mapped) images. The first step is the ability for a remote display capability. This is the ability to have full real-time graphics being displayed remotely with very little communications bandwidth required. Such a remote display system of the present invention is illustrated in FIG. 1. A local display may also be setup (optional) for monitoring what is being displayed in real-time at the remote site.

It is understood that non-real-time remote display of graphics and images is similarly accomplished by the present invention. Thus, as described herein the real-time applications of the present invention is for purposes of illustration and not limitation. That is, the present invention provides remote display of graphics and images in either real-time or non-real-time (or a mixture) as desired.

In FIG. 1a, a local workstation or display system 10 is coupled to one end of a communication Channel 12 (e.g., a telephone line or Internet line). A remote workstation/display system 14 is coupled to the opposite end of channel 12 for communication between systems 10 and 14. Each workstation 10,14 includes a video graphics display monitor 11a,b and input devices such as a keyboard, mouse and the like coupled to a digital processor. The digital processor may be of the PC or similar type having processing capabilities comparable to a XX486 Intel chip for example. Further, each display system 10,14 (or at least remote system 14) is configured like the computer system 61 of FIGS. 4a–4b. That is, they each (or at lest remote system 14) contain a computer graphics and animation assembly 16 for producing intermediate images (views) from given sample images/views (i.e., from input parameters 18 indicative of the sample views).

Input parameters 18 (i.e., the control points and parameter values for a desired movement α) are sent to at least remote system 14, or both the local display system 10 and the remote display 14. Very low bandwidth of the communication channel 12 is required because only a few parameter values are being sent for each image frame (even without applying any data compression techniques to the parameters). In the preferred embodiment, a communication bandwidth of less than 14K baud (or more accurately, about 1,500 bits per second to about 3,000 bits per second) is required. Each desired image is synthesized from the input parameters 18 received at the remote site 14, using HBF Interpolation at assembly 16b (detailed above in FIGS. 4a,b and 5). The remote system 14 then displays the generated images on its display monitor 11b remotely from the input site 10 of the parameters 18.

The sample reference images used in the HBF interpolation are sent at the time the remote system 14 is started up (initialization time), or a reference set of images of characters (or subjects) may have been kept locally by the remote system 14 (e.g., there could be a library of characters stored in memory or in a storage area accessible by remote system 14).

It is also possible to update the example reference images at either or both the local and the remote sites 10,14 when necessary, including sending a totally new set of sample images to replace the old set. Such adaptive updating is necessary (or beneficial) when a large number of independent variations exist in the image sequence to be remotely displayed. A variation of an image is independent of other variations if and only if it can not be generated as a linear combination of those other variations.

Figure 1B:
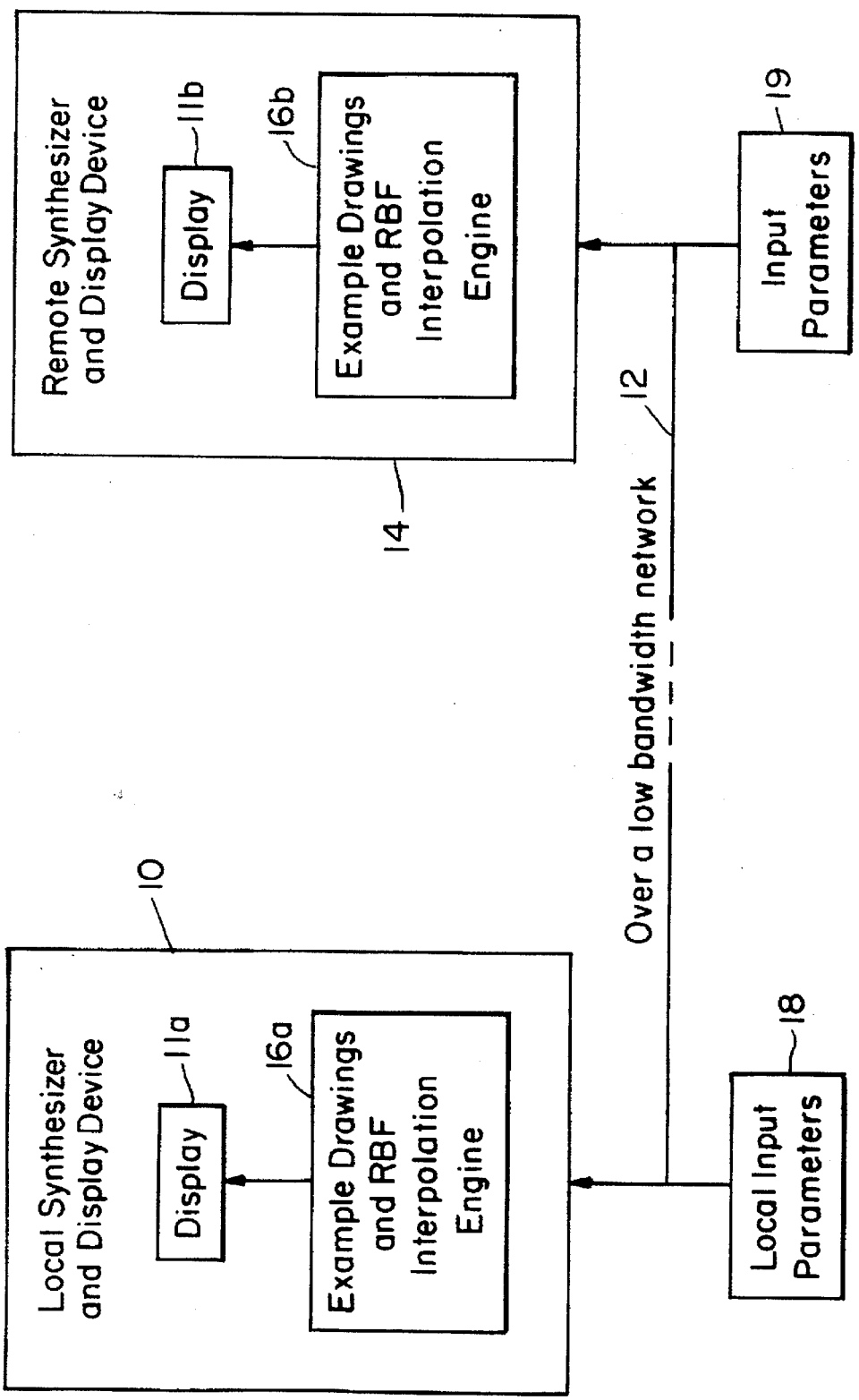

Continuing with FIG. 1a, each of the desired images is also synthesized from the input parameters 18, through assembly 16a at the local system 10 to monitor the display generated at the remote system 14 from the same input parameters 18. As mentioned above, this is (monitoring in real-time or non-real-time) optional and would display the images on the display monitor 11a of local system 10. Alternative, to or in addition to display of the same images on monitors 11a and 11b is the display of different images, as illustrated in FIG. 1b. Just as input parameters 18 initiated at the local site 10 end of communication line 12 generate desired images on remote system 14, other input parameters 19 initiated at the remote site 10 end of line 12 generate other images on local system 10. If these other images are to be monitored at the remote system 14, then the display monitor 11b of remote system 14 would change display from the initially generated desired images to the other images. Image storage/retrieval and/or caching using methods and means common in the art may be incorporated in systems 10 and 14 for that purpose (i.e., changing display between two sets of generated images, one from local input parameters 18 and one from other parameters 19 input at the remote site 14).

Figure 2:
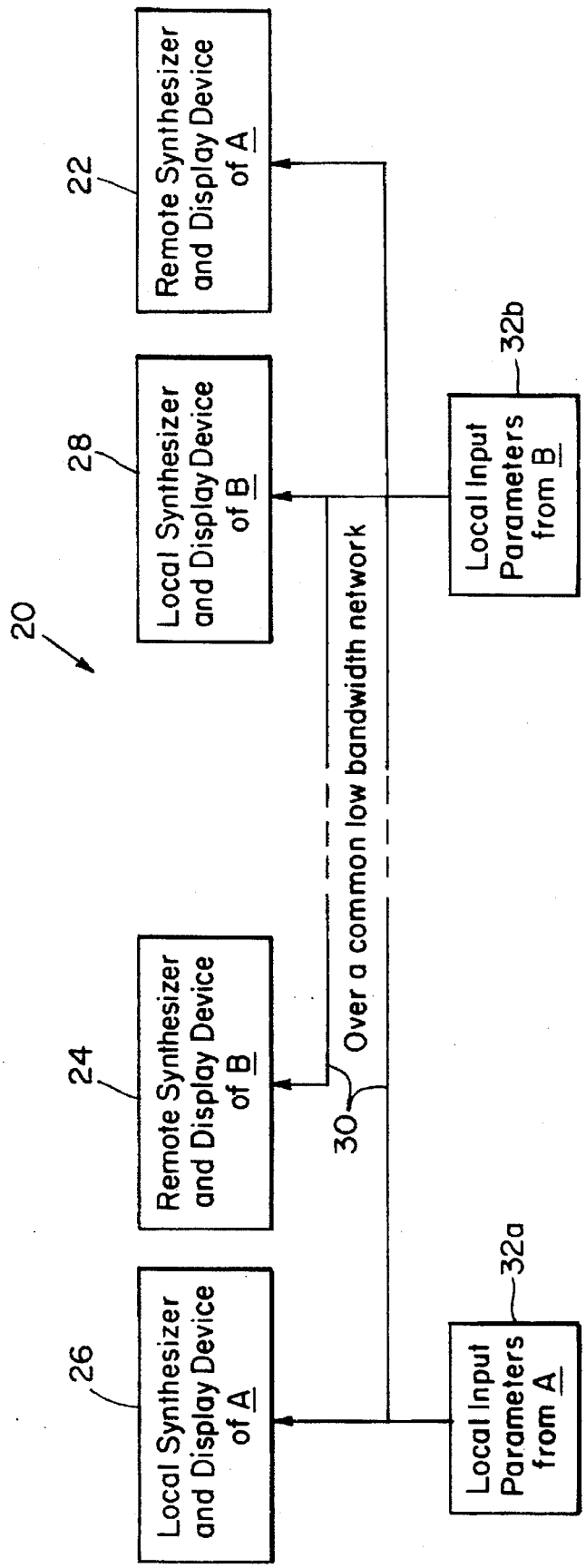
FIG. 2 is a block diagram of a telecommunications system embodying the present invention.

Alternative to the embodiments of FIGS. 1a and 1b, another embodiment of the present invention is as follows. Let A and B be two persons far apart from each other. With the remote display capability of the present invention, a telecommunication system 20 can be setup between A and B as illustrated in FIG. 2. A pair of remote display systems 22,24 are setup, one for A and one for B. The local display system 26 for A is coupled to corresponding remote display system 22 for A across a communication line 30 similar to that in FIGS. 1a–1b. Likewise, the local display system 28 for B is coupled to its corresponding remote display system 24 across the same communication line 30. Each display system 22,24,26,28 employs a computer graphics and animation assembly 16 and a display monitor 11 like that of FIGS. 1a–1b and detailed above in FIGS. 4a–5. The low bandwidth channel 30 is a telephone line or a link in the Internet, or the like.

Operation of each pair of display systems 22,24,26,28 is then like that described in FIGS. 1a–1b, except that monitoring at the local respective site may now be done side by side with generation and display of images from parameters input at the respective remote site. That is, while local system 26 (i.e., its display monitor) displays the images remotely generated and displayed at respective remote system 22, neighboring system 24 (at the local system 26 end of channel 30) displays other images generated from other parameters 32b input at the second system 28 at the remote (opposite) end of channel 30. Likewise, second system 28 through its display monitor displays the other images (for monitoring the respective remote display of those images as generated at its respective remote system 24), While adjacent thereto, system 22 displays the images generated from input parameters 32a transmitted across channel 30 from system 26.

With the illustrated configuration, A and B can communicate with each other by interactively updating the input parameters 32a,b at the respective local site. As such, telecommunication systems 20 may also be used in remote multi-person computer games. The input parameters 32, from each player represent their responses to the other player's remotely displayed image. Where real-time interaction together with real-time monitoring is not critical, the updating of input parameters 18,19 at the respective local site may similarly be done in FIG. 1b.

Figure 3:
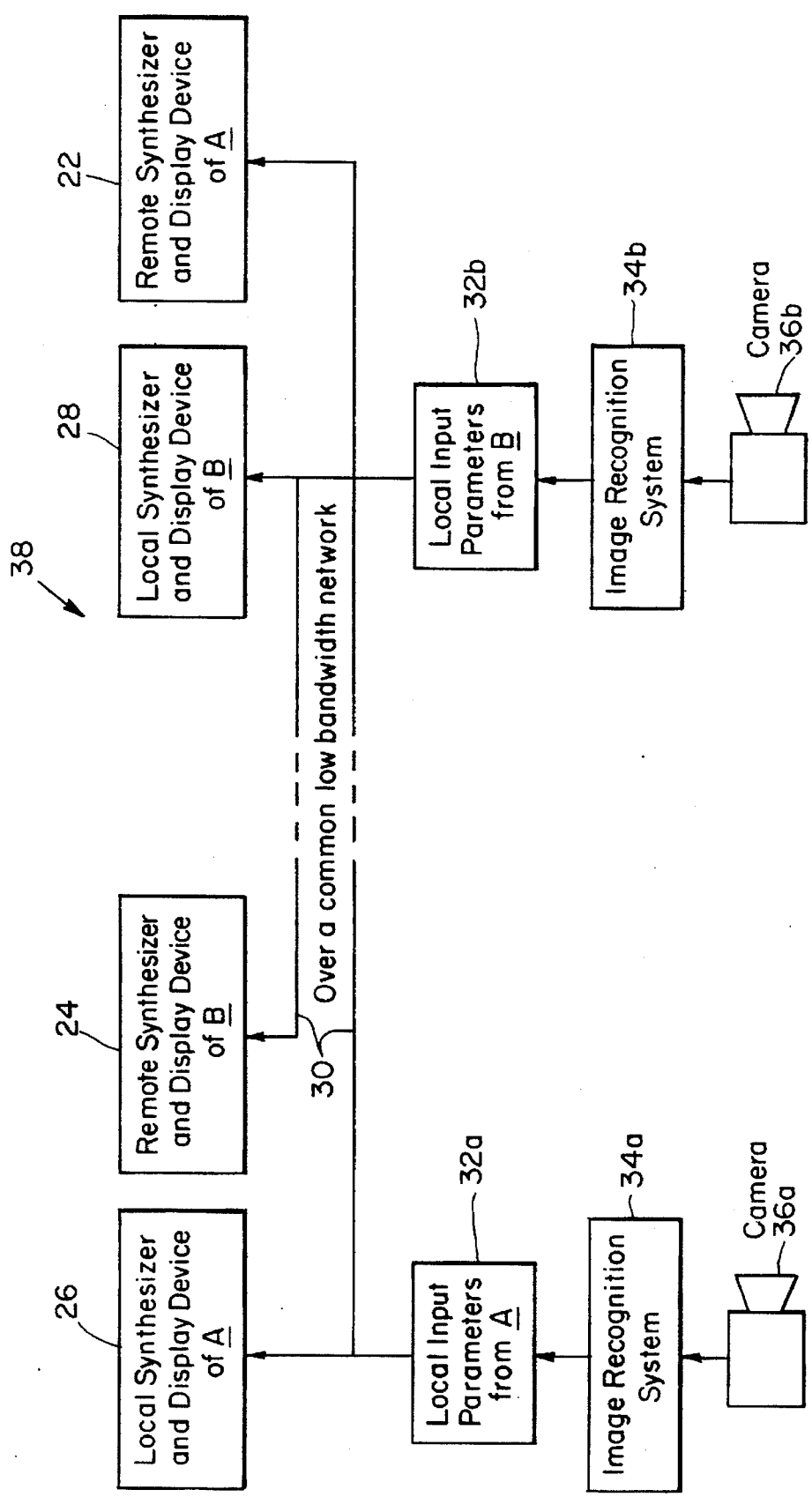
FIG. 3 is a block diagram of the telecommunications system of FIG. 2 coupled with an image recognition system to form a video phone system of the present invention.

In accordance with another aspect of the present invention, the input parameters 32 may be generated either directly by the users (for example, a simple keyboard, joystick, mouse, or similar device for them to enter the numbers) or by any other method. For example, coupled with an image recognition system 34a,b at each site as illustrated in FIG. 3, the telecommunication system 20 of FIG. 2 becomes a "video phone" 38 with cartoon images. Each image recognition system 34a,b includes (i) a video or movie camera 36a,b for capturing and inputting real-time (i.e., bitmap) images of the local user, (ii) computer means for recognizing or extracting certain features from the camera images (for example, a set of line segments), and (iii) means for mapping the extracted features to parameter values to be used as local input at 32a,b.

The purpose of the image recognition systems 34a,b is to automate generation of the local input parameters 32a,b (parameters representative of the images of the local user as seen through the respective camera 36a,b in this example). Instead of asking users to look for and provide the right parameter values of desired images, the image recognition system 34a,b automatically generates the parameters that best represent the captured camera images. Those input parameters are then transmitted over communications channel 30 to the corresponding remote display system 24,22, which in turn generates and displays images of the user (along with other/cartoon images described in FIG. 2) using HBF interpolation (detailed above in FIGS. 4a–5). For example, the remote display system 24,22 displays a cartoon character of the user through HBF interpolation of the input parameters with respect to a predefined character/subject. In another example, an icon is formed as desired. User control of movement of the icon and remote display thereof is then enabled by the present invention systems 20,38 of FIGS. 1a through 3.

In one embodiment, image recognition systems 34a,b employ feature extraction or other image recognition techniques common in the art, coupled with a neural network 51 (FIG. 5) to implement parts (ii) and (iii) above. In this case, however, the inputs and outputs are the reverse of that used for HBF interpolation described in FIG. 5. Instead of the inputs being parameter values and the outputs being control point positions (as for HBF interpolation), the image recognition system 34a,b inputs positions of certain extracted features (like control points) to neural network 51 and obtains parameter values as output. Training of neural network 51 for this purpose (i.e. for mapping extracted features to parameter values) is based on the same principles as that described in FIG. 5 for HBF interpolation.

Other image recognition systems are suitable.

Another major area of application where people are using "cartoon characters" to represent themselves to others, occurs in the "chat rooms" being offered by many on line services (e.g., America Online Company). In the present invention, the local user A checks into a "chat room" provided by the online service company (say, the user A would like to talk with other Internet users who are into gardening and tropical plants). Local user A next chooses a character that is a simple bit mapped icon to represent himself. All the other chat room attendees can see local user A and some simple motions that user A is allowed to remotely display through the chosen icon representing user A; likewise local user A can see them through respective remotely displayed icons. The present invention video phone 38 (and HBF interpolation technology) then brings full interactive animated cartoon graphics to this chat room scenario. Because of the low bandwidth requirements, the system (i.e., chat room scenario together with video phone 38) can run in real-time as the discussions are flying around the room with fully animated characters (icons) some or all of which represent the users.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, in combination with the foregoing, the input parameters may undergo data compression before transmission over the communication channel. Appropriate data decompression would then be utilized at the receiving (remote) site. This would further decrease the communication bandwidth requirement as desired and is optional.

Although, telephone lines and links on the Internet are specified above, it is understood that these are illustrative of, and not limitations on, the type of low bandwidth channels to which the present invention is directed. It is understood that the minimum communications bandwidth requirement of the present invention is in the range of about 1,500 bits per second to about 3,000 bits per second. Communication channels having larger bandwidths are thus suitable for (not necessitated by) the present invention.

Further, the foregoing mentions vector based images, memory based images and bit map images. A "vector based image" refers to a model-based drawing in which the whole drawing is specified by giving a few control points (a vector). The following examples are illustrative:

Line segments are model-based drawings. As soon as two end points are given, a line segment between the end points can be drawn.

A circle is another model. The control parameters are the center position and the diameter. From these control parameters a desired circle can be drawn.

A Bezier curve (or cubical curves) is another model. A unique Bezier curve can be drawn after four control points are given.

The "memory-based images" terminology is not directly related to the other two. Memory-based images refers to the images generated by example-based interpolation techniques.

Bitmap images are the kind of images used in newspaper printing or in facsimile machines. The image is defined by specifying the intensity of the color (i.e., grey level) at each position in a grid.

Further, although the foregoing is directed to video conferencing, and more generally, remote communication of computer generated images and graphics, it is understood that a combination of images, graphics, text and voice transmission is within the purview of one skilled in the art. Where the present invention utilizes a low communication bandwidth, (e.g, telephone line or Internet line), voice or text transmissions along with the present invention image data transmissions would be implemented using a combination of voice mail technology, e-mail technology, telephone/facsimile technology and the HBF interpolation technology of the present invention. To that end, the present invention remote communication of computer generated images may be in non-real-time in certain applications, e.g., video e-mail. FIG. 1a would be such a system that supports video e-mail, i.e., remote communication of an image formed message.

As used herein, a "workstation" does not necessarily indicate a network of computers. Stand-alone or PC type digital processors are suitable at each location along the communication channel discussed above and shown in the drawings.

What is claimed is:

1. Apparatus for remote communication of images and graphics comprising:

a low bandwidth communication channel;

a first workstation coupled to one end of the communication channel, the first workstation including a display monitor and an input device enabling user input of data to the first workstation end of the communication channel; and a second workstation coupled to an opposite end of the communication channel such that data is able to be transmitted between the first and second workstation, the second workstation including a display monitor and a computer graphics and animation assembly having (i) a preprocessor for determining control points and corresponding plane coordinate values of a subject along working axes in a sample view, the sample view having parameter values of each working axis indicative of the position of the subject in that sample view, and (ii) an image processor coupled to preprocessor and responsive to the associations between the coordinate values of the control points and the parameter values of a sample view, the image processor mapping the coordinate values of control points for sample positions of the subject in plural sample views to control point coordinate values for desired intermediate positions of the subject along each working axis to form intermediate views of the subject;

in response to user input at the first workstation end of the communication channel of parameter values of desired views, the second workstation receiving the input parameter values across the communication channel and using the computer graphics and animation assembly forms the desired views and displays said views on the display monitor of the second workstation, such that the views are displayed remotely from the first workstation.

2. Apparatus as claimed in claim 1 wherein the communication channel has a bandwidth in the range of about 1,500 bits per second through about 3,000 bits per second.

3. Apparatus as claimed in claim 1 wherein the first workstation includes a computer graphics and animation assembly and in response to the input parameter values, the first workstation forms the desired views using its computer graphics and animation assembly and displays said views on the display monitor of the first workstation, such that the first workstation monitors the views displayed on the second workstation display monitor.

4. Apparatus as claimed in claim 3 wherein:

the second workstation includes input means enabling user input of data to the second workstation end of the communication channel; and in response to the views displayed on the display monitor of the second workstation, user input at the second workstation of other parameter values of response views desired by a user at the second workstation are transmitted across the communication channel to the first workstation, the first workstation being responsive to the other parameter values and using its computer graphics and animation assembly forms the response views and displays said views on the display monitor of the first workstation remotely from the second workstation.

5. Apparatus as claimed in claim 4 wherein the other parameter values input at the second workstation update the parameter values input at the first workstation end of the communication channel such that the first workstation displays views that are variations of the views displayed at the second workstation.

6. Apparatus as claimed in claim 1 wherein the parameter values input at the first workstation end of the communication channel include parameters for modifying the sample views at the second workstation; and the second workstation receiving said parameters across the communication channel and using its computer graphics and animation assembly modifies the sample views.

7. Apparatus as claimed in claim 1 further comprising:

a third workstation coupled to the first workstation end of the communication channel, having a display monitor and a computer graphics and animation assembly for forming images from input data;

a fourth workstation coupled to the opposite end of the communication channel, having a display monitor and input means enabling user input of data to the fourth workstation in a manner such that data is able to be transmitted between the third and fourth workstations across the communication channel; and in further response to the views displayed on the display monitor of the second workstation, user input at the fourth workstation of other parameter values of response views desired by a user at the fourth workstation being transmitted across the communication channel to the third workstation, the third workstation being responsive to the other parameter values and using its computer graphics and animation assembly forming the response views and displaying said views on the display monitor of the third workstation remotely from the fourth workstation, in a manner such that a user at the first workstation and the user at the fourth workstation are responding in real-time to each others remotely displayed views and thus video conferencing.

8. Apparatus as claimed in claim 7 further comprising:

a first image recognition system coupled to the first workstation end of the communication channel;

a second image recognition system coupled to the fourth workstation end of the communication channel;

a first camera coupled to the first image recognition system; and a second camera coupled to the second image recognition system;

the first image recognition system and first camera providing a video image of a user at the first workstation end of the communication channel, said video image being input as parameter values at the first workstation end of the communication channel and being transmitted across the communication channel to the second workstation such that an image of the first workstation user is displayed on the display monitor of the second workstation in combination with the desired views;

the second image recognition system and second camera providing video images of a user at the fourth workstation, said video images forming input parameter values at the fourth workstation end of the communication channel and being transmitted across the communication channel to the third workstation such that an image of a user at the fourth workstation is displayed on the display monitor of the third workstation in combination with the response views displayed on the display monitor of the third workstation.

9. Apparatus as claimed in claim 7 wherein the respective remotely displayed views include animated icons formed by respective computer graphics and animation assemblies in response to respective parameter values and said other parameter values.

10. Apparatus as claimed in claim 1 wherein the displayed desired views include a video e-mail message.

11. Computer apparatus for remote communication of images and graphics comprising:

a communication channel; and a multiplicity of workstations coupled to the communication channel for communication across a distance, such that at least one of the workstations is remote from a second one of the workstations, each workstation in the multiplicity having (i) input means enabling user input of image data through the workstation to the communication channel for transmission thereon, (ii) a display monitor, and (iii) a computer graphics and animation assembly for forming views of a subject from parameter values using hyper basis function interpolation with respect to predefined sample views;

in response to user input at the one workstation of parameter values of desired views, the second workstation receiving the input parameter values across the communication channel and using its computer graphics and animation assembly forms the desired views and displays said views on the display monitor of the second workstation, such that the views are displayed remotely from the one workstation.

12. Apparatus as claimed in claim 11 wherein the communication channel has a low bandwidth below 14K bauds.

13. Apparatus as claimed in claim 11 wherein the computer graphics and animation assembly of each workstation further employs one of radial basis function interpolation, regularization functions and multivariable splines.

14. Apparatus as claimed in claim 11 wherein in response to the input parameter values, the one workstation forms the desired views using its computer graphics and animation assembly and displays said views on the display monitor of the one workstation, such that the one workstation monitors the views displayed on the second workstation display monitor.

15. Apparatus as claimed in claim 11 wherein in further response to the views displayed on the display monitor of the second workstation, user input at the second workstation end of the communication channel of other parameter values of response views desired by a user at the second workstation being transmitted across the communication channel to the one Workstation, the one workstation being responsive to the other parameter values and using its computer graphics and animation assembly forming the response views and displaying said views on the display monitor of the one workstation remotely from the second workstation, in a manner such that a user at the one workstation and the user at the second workstation are responding in real-time to each others remotely displayed views and thus video conferencing.

16. Apparatus as claimed in claim 11 wherein further parameters are input at the one workstation, the second workstation receiving said further parameters across the communication channel and using said parameters updates one of the parameter values of the desired views and the sample views, such that the second workstation displays views that are variations of the desired views.

17. Apparatus as claimed in claim 11 further comprising means for automatic input of the parameter values through a workstation to the communication channel for transmission thereon.

18. Apparatus as claimed in claim 17 wherein the automatic input means includes:

a first image recognition system coupled to the one workstation end of the communication channel;

a second image recognition system coupled to the second workstation end of the communication channel;

a first camera coupled to the one image recognition system; and a second camera coupled to the second image recognition system;

the first image recognition system and first camera providing video image of a user at the one workstation end of the communication channel, said video image being automatically input as parameter values at the one workstation end of the communication channel and being transmitted across the communication channel to the second workstation such that an image of the one workstation user is formed by the computer graphics and animation assembly of the second workstation and is displayed on the display monitor of the second workstation;

the second image recognition system and second camera providing video images of a user at the second workstation, in a manner such that said video images form input parameter values at the second workstation end of the communication channel and are transmitted across the communication channel to the one workstation, the computer graphics and animation assembly of the one workstation being responsive to said input parameter values and therefrom forming an image of the user at the second workstation and displaying said image on the display monitor of the one workstation.

19. Apparatus as claimed in claim 11 wherein said desired views include animated icons controlled by a user through the parameter values input at the one workstation.

20. Apparatus as claimed in claim 11 wherein the displayed desired views include a video e-mail message.

21. A method for remote communication of computer images and graphics, comprising the steps of:

providing a low bandwidth communication channel;

coupling a first workstation to one end of the communication channel, the first workstation including a display monitor and an input device for user input of data to the first workstation end of the communication channel;

coupling a second workstation to an opposite end of the communication channel such that data is able to be transmitted between the first and second workstations, the second workstation including (a) a display monitor, (b) input means, and (c) a computer graphics and animation assembly for forming views of a subject using interpolation of input parameters of the views with respect to predefined initial sample views;

at the first workstation end of the communication channel, inputting parameters of desired views, and transmitting said input parameters across the communication channel from the first workstation to the second workstation; and receiving the input parameters at the second workstation, and using the computer graphics and animation assembly of the second workstation, forming the desired views and displaying said views on the display monitor of the second workstation, such that the desired views are displayed remotely from the first workstation.

22. A method as claimed in claim 21 wherein the computer graphics and animation assembly uses one of radial basis function interpolation, regularization and multivariable splines.

23. A method as claimed in claim 21 wherein the step of forming the desired views using the computer graphics and animation assembly includes:

determining control points and corresponding plane coordinate values of the subject along working axes in a sample view, the sample view having parameter values of each working axis indicative of the position of the subject in that sample view; and mapping the coordinate values of control points for sample positions of the subject in plural sample views to control point coordinate values for desired positions of the subject along each working axis to form the desired views of the subject.

24. A method as claimed in claim 21 further comprising the steps of:

providing at the first workstation a computer graphics and animation assembly for forming images by interpolation of image parameters with respect to predefined sample views; and in response to the input parameters of the desired views, forming the desired views using the first workstation computer graphics and animation assembly and displaying said desired views on the display monitor of the first workstation such that said first workstation monitors the views displayed at the second workstation.

25. A method as claimed in claim 21 further comprising the steps of:

providing at the first workstation a computer graphics and animation assembly for forming images by interpolation of image parameters with respect to predefined sample views;

in response to the desired views displayed at the second workstation, inputting at the second workstation other parameter values of response views desired by a user at the second workstation;

transmitting the other parameter values across the communication channel to the first workstation;

using the computer graphics and animation assembly of the first workstation, responding to the transmitted other parameter values and forming the response views; and displaying said response views on the display monitor of the first workstation remotely from the second workstation.

26. A method as claimed in claim 25 wherein said steps further provide video conferencing, by a user at the first workstation and the user at the second workstation responding in real-time to each others remotely displayed views and thus video conferencing.

27. A method as claimed in claim 25 further comprising the steps of:

coupling a first image recognition system to the first workstation end of the communication channel;

coupling a first camera to the first image recognition system;

coupling a second image recognition system to the second workstation end of the communication channel;

coupling a second camera to the second image recognition system;

using the first image recognition system and first camera, providing a video image of a user at the first workstation end of the communication channel and inputting the video image as input parameters at the first workstation end of the communication channel, such that said input parameters are transmitted across the communication channel to the second workstation and an image of the first workstation user is displayed on the display monitor at the second workstation; and using the second image recognition system and second camera, providing video images of a user at the second workstation and inputting the video images as parameters at the second workstation end of the communication channel, such that said parameters are transmitted across the communication channel to the first workstation and an image of the second workstation user is displayed on the display monitor of the first workstation.

28. A method as claimed in claim 21 further comprising the steps of:

inputting at the first workstation further parameters;

receiving the further parameters at the second workstation across the communication channel; and updating one of the input parameters of the desired views and the initial sample views, such that the second workstation forms and displays views that are variations of the desired views.

29. A method as claimed in claim 21 wherein the step of inputting parameters of desired views includes automatically generating the input parameters.

30. A method as claimed in claim 21 wherein said step of forming the desired views at the second workstation includes forming video messages from the received input parameters.

31. A method as claimed in claim 21 wherein said desired views includes animated icons, and the step of inputting at the first workstation end of the communication channel, parameters of the desired views, includes a user controlling movement of the animated icons through the input parameters.

\* \* \* \* \*